US012571555B2

(12) United States Patent
Nagarathinam et al.

(10) Patent No.: US 12,571,555 B2
(45) Date of Patent: Mar. 10, 2026

(54) METHOD AND SYSTEM FOR PHYSICS AWARE CONTROL OF HVAC EQUIPMENT

(71) Applicant: Tata Consultancy Services Limited, Mumbai (IN)

(72) Inventors: Srinarayana Nagarathinam, Chennai (IN); Yashovardhan Sushil Chati, Bangalore (IN); Arunchandar Vasan, Chennai (IN); Malini Pooni Venkat, Chennai (IN)

(73) Assignee: TATA CONSULTACNY SERVICES LIMITED, Mumbai (IN)

( * ) Notice: Subject to any disclaimer, the term of this patent is extended or adjusted under 35 U.S.C. 154(b) by 391 days.

(21) Appl. No.: 18/498,980

(22) Filed: Oct. 31, 2023

(65) Prior Publication Data

US 2024/0167713 A1 May 23, 2024

(30) Foreign Application Priority Data

Nov. 8, 2022 (IN) .............................. 202221063657

(51) Int. Cl.
*F24F 11/63* (2018.01)
*G05B 13/02* (2006.01)
(52) U.S. Cl.
CPC ............ *F24F 11/63* (2018.01); *G05B 13/027* (2013.01)
(58) Field of Classification Search
None
See application file for complete search history.

(56) References Cited

U.S. PATENT DOCUMENTS

2021/0041127 A1* 2/2021 Risbeck ................... F24F 11/62

OTHER PUBLICATIONS

Di Natale, L. & Svetozarevic, B. & Heer, P. & Jones, C.N., 2022. "Physically Consistent Neural Networks for building thermal modeling: Theory and analysis," Applied Energy, Elsevier, vol. 325(C). (Year: 2022).*
Antonelo, Eric Aislan et al., "Physics-Informed Neural Nets for Control of Dynamical Systems", Date: 2022, Publisher: arxiv, Link: https://arxiv.org/pdf/2104.02556.pdf.

(Continued)

*Primary Examiner* — Adam R Mott
(74) *Attorney, Agent, or Firm* — FINNEGAN, HENDERSON, FARABOW, GARRETT & DUNNER LLP

(57) ABSTRACT

Use of Physics Informed Neural networks (PINNs) to control building systems is non-trivial, as basic formalism of PINNs is not readily amenable to control problems. Specifically, exogenous inputs (e.g., ambient temperature) and control decisions (e.g., mass flow rates) need to be specified as functional inputs to the neural network, which may not be known a priori. The input feature space could be very high dimensional depending upon the duration (monthly, yearly, etc.) and the (min-max) range of the inputs. The disclosure herein generally relates to Heating, Ventilation, and Air-Conditioning (HVAC) equipment, and, more particularly, to method and system for physics aware control of HVAC equipment. The system generates a neural network model based on a plurality of exogeneous variables from the HVAC. The generated neural network model is then used to generate the one or more control signal recommendations, which are further used to control operation of the HVAC.

12 Claims, 9 Drawing Sheets

(56) References Cited

OTHER PUBLICATIONS

Gokhale, Gargya et al., "Physics Informed Neural Networks for Control Oriented Thermal Modeling of Buildings", Date: 2022, Publisher: arxiv, Link: https://arxiv.org/pdf/2111.12066.pdf.

Nellikkath, Rahul et al., "Physics-Informed Neural Nets for Control of Dynamical Systems", Title of the item: Electric Power Systems Research, Date: 2022, vol. 212, Publisher: Elsevier, Link: https://www.sciencedirect.com/science/article/pii/S0378779622005636.

* cited by examiner

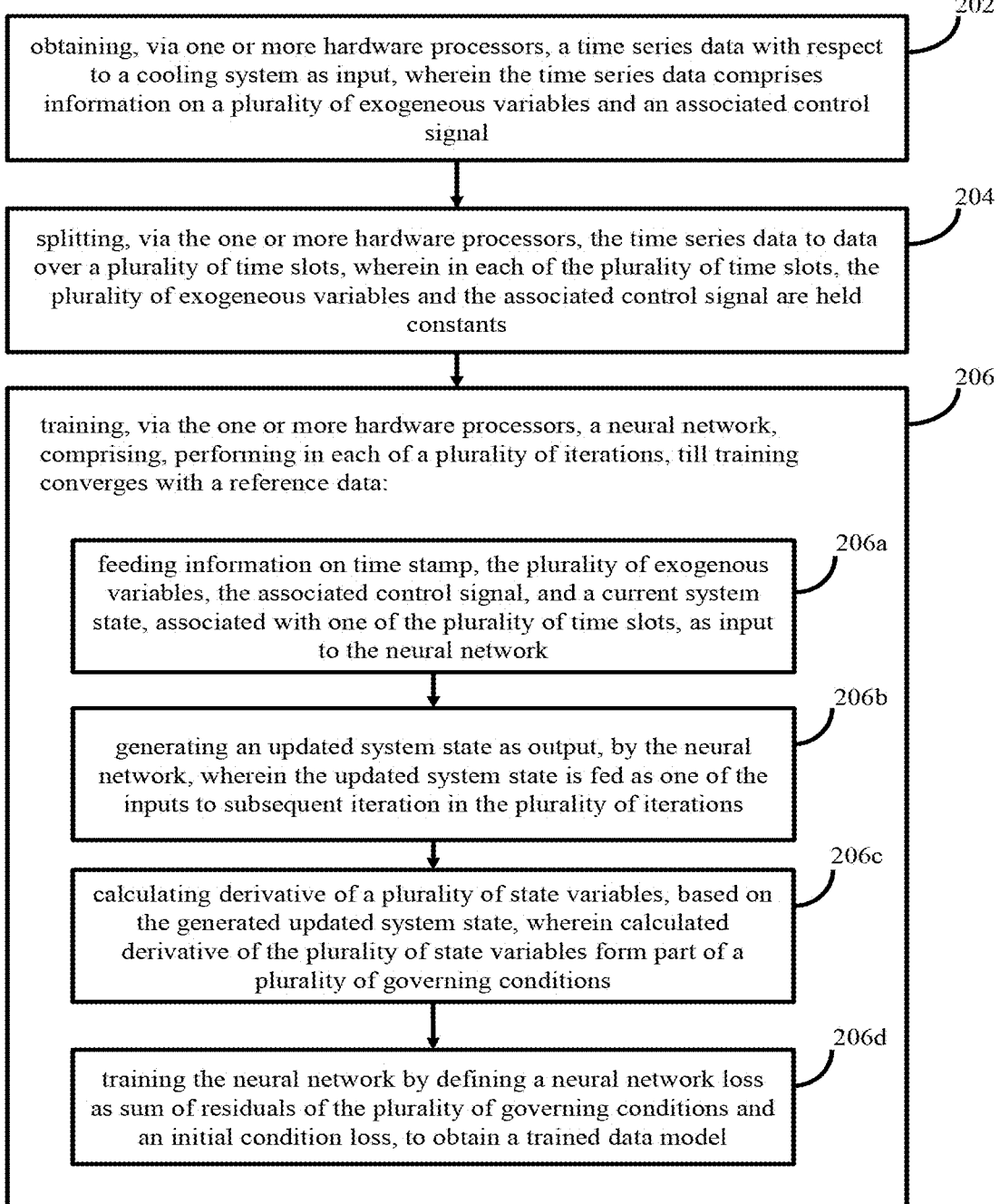

202 obtaining, via one or more hardware processors, a time series data with respect to a cooling system as input, wherein the time series data comprises information on a plurality of exogeneous variables and an associated control signal

204 splitting, via the one or more hardware processors, the time series data to data over a plurality of time slots, wherein in each of the plurality of time slots, the plurality of exogeneous variables and the associated control signal are held constants

206 training, via the one or more hardware processors, a neural network, comprising, performing in each of a plurality of iterations, till training converges with a reference data:

206a feeding information on time stamp, the plurality of exogenous variables, the associated control signal, and a current system state, associated with one of the plurality of time slots, as input to the neural network 206b generating an updated system state as output, by the neural network, wherein the updated system state is fed as one of the inputs to subsequent iteration in the plurality of iterations 206c calculating derivative of a plurality of state variables, based on the generated updated system state, wherein calculated derivative of the plurality of state variables form part of a plurality of governing conditions 206d training the neural network by defining a neural network loss as sum of residuals of the plurality of governing conditions and an initial condition loss, to obtain a trained data model

FIG. 2

(b) PINN humidity model vs true humidity

METHOD AND SYSTEM FOR PHYSICS AWARE CONTROL OF HVAC EQUIPMENT

PRIORITY CLAIM

This U.S. patent application claims priority under 35 U.S.C. § 119 to: Indian Patent Application No. 202221063657, filed on Nov. 8, 2022. The entire contents of the aforementioned application are incorporated herein by reference.

TECHNICAL FIELD

The disclosure herein generally relates to Heating, Ventilation, and Air-Conditioning (HVAC) equipment, and, more particularly, to method and system for physics aware control of HVAC equipment.

BACKGROUND

Buildings contribute significantly to energy consumption and carbon footprints. Because Heating, Ventilation, and Air-Conditioning (HVAC) alone accounts for 40% of building energy consumption, energy management for HVAC systems has received significant research attention. Most HVAC deployments currently use proportional-integral-derivative (PID) control that uses only an error between the realized and target (setpoint) air temperatures to operate Air Handling Unit (AHUs) and chillers. PID control is widespread due to the ease of implementation in firmware. Therefore, the main focus in HVAC energy management has been to save energy through intelligent control that improves over PID-based as-is control even while meeting occupant comfort requirements.

Unmeasured thermal parameters: Intelligence in HVAC control improves over PID control by using additional sensing parameters (e.g., occupancy) and/or through optimization in control (e.g., model-predictive or reinforcement learning based). Since additional sensory deployments or extensive measurements may not be readily possible, the main focus generally has been on better methods for optimization in control. However, in practice, some parameters that do not have sensory readings can nevertheless be critical in determining system performance irrespective of the control strategy used. Specifically, consider the surface temperature of the walls of a building. In most deployments, sensors typically exist only for the room air temperature ($T_a$), room humidity ($W_a$), supply and return temperatures, but not the wall temperature ($T_w$). Several research works estimate wall temperature using a functional approximation involving outdoor ambient ($T_\alpha$) and indoor air ($T_a$) temperatures or use $T_a$ as a proxy for $T_w$ in thermal comfort calculations. However, using a wrong value for $T_w$ (e.g., with 5% error) can cause percentage discomfort to increase (by 80% points) and energy consumption to increase/decrease (by up to 13%).

In order to obtain values of parameters that are directly not measurable, Physics Informed Neural networks (PINNs) are used. However, using PINNs to control building systems is non-trivial for several reasons. Basic formalism of PINNs is not readily amenable to control problems. Specifically, exogenous inputs (e.g., ambient temperature) and control decisions (e.g., mass flow rates) need to be specified as functional inputs to the neural network, which may not be known a priori. The input feature space could be very high dimensional depending upon the duration (monthly, yearly, etc.) and the (min-max) range of the inputs.

SUMMARY

Embodiments of the present disclosure present technological improvements as solutions to one or more of the above-mentioned technical problems recognized by the inventors in conventional systems. For example, in one embodiment, a processor implemented method of generating a neural network model is provided. In this method, initially a time series data with respect to a cooling system is obtained as input, via one or more hardware processors, wherein the time series data comprises information on a plurality of exogenous variables and an associated control signal. Further, the time series data is split, via the one or more hardware processors, to data over a plurality of time slots, wherein in each of the plurality of time slots, the plurality of exogenous variables and the associated control signal are held constants. Further, a neural network is trained via the one or more hardware processors. Training the neural network includes performing in each of a plurality of iterations, till training converges with a reference data, the following steps. In this process, information on time stamp, the plurality of exogenous variables, the associated control signal, and a current system state, associated with one of the plurality of time slots are fed as input to the neural network. Further, an updated system state is generated as output, by the neural network, wherein the updated system state is fed as one of the inputs to subsequent iteration in the plurality of iterations. Further, derivative of a plurality of state variables is calculated based on the generated updated system state, wherein calculated derivative of the plurality of state variables form part of a plurality of governing conditions. Further, the neural network is trained by defining a neural network loss as sum of residuals of the plurality of governing conditions and an initial condition loss, to obtain a trained data model.

In another aspect, one or more control signal recommendations are generated based on a plurality of future system states predicted by the trained data model.

In yet another aspect, a system for generating a neural network model is provided. The system includes one or more hardware processors, a communication interface, and a memory storing a plurality of instructions. The plurality of instructions when executed, cause the one or more hardware processors to obtain a time series data with respect to a cooling system as input, wherein the time series data comprises information on a plurality of exogenous variables and an associated control signal. Further, the time series data is split, via the one or more hardware processors, to data over a plurality of time slots, wherein in each of the plurality of time slots, the plurality of exogenous variables and the associated control signal are held constants. Further, a neural network is trained via the one or more hardware processors. Training the neural network includes performing in each of a plurality of iterations, till training converges with a reference data, the following steps. In this process, information on time stamp, the plurality of exogenous variables, the associated control signal, and a current system state, associated with one of the plurality of time slots are fed as input to the neural network. Further, an updated system state is generated as output, by the neural network, wherein the updated system state is fed as one of the inputs to subsequent iteration in the plurality of iterations. Further, derivative of a plurality of state variables is calculated based on the generated updated system state, wherein calculated derivative of the plurality of state variables form part of a plurality of governing conditions. Further, the neural network is trained by defining a neural network loss as sum of residuals of the plurality of governing conditions and an initial condition loss, to obtain a trained data model.

In yet another aspect, the one or more hardware processors are configured to generate the one or more control signal recommendations based on a plurality of future system states predicted by the trained data model.

In yet another aspect, a non-transitory computer readable medium for generating a neural network model is provided. The non-transitory computer readable medium includes a plurality of instructions, which when executed, cause one or more hardware processors to perform the following steps. Initially a time series data with respect to a cooling system is obtained as input, via one or more hardware processors, wherein the time series data comprises information on a plurality of exogeneous variables and an associated control signal. Further, the time series data is split, via the one or more hardware processors, to data over a plurality of time slots, wherein in each of the plurality of time slots, the plurality of exogeneous variables and the associated control signal are held constants. Further, a neural network is trained via the one or more hardware processors. Training the neural network includes performing in each of a plurality of iterations, till training converges with a reference data, the following steps. In this process, information on time stamp, the plurality of exogenous variables, the associated control signal, and a current system state, associated with one of the plurality of time slots are fed as input to the neural network. Further, an updated system state is generated as output, by the neural network, wherein the updated system state is fed as one of the inputs to subsequent iteration in the plurality of iterations. Further, derivative of a plurality of state variables is calculated based on the generated updated system state, wherein calculated derivative of the plurality of state variables form part of a plurality of governing conditions. Further, the neural network is trained by defining a neural network loss as sum of residuals of the plurality of governing conditions and an initial condition loss, to obtain a trained data model.

In another aspect, the non-transitory computer readable medium causes the one or more hardware processors to generate one or more control signal recommendations based on a plurality of future system states predicted by the trained data model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 is a flow diagram depicting steps involved in the process of physics aware control of HVAC equipment, by the system of FIG. 1, according to some embodiments of the present disclosure.

DETAILED DESCRIPTION

Figure 1:
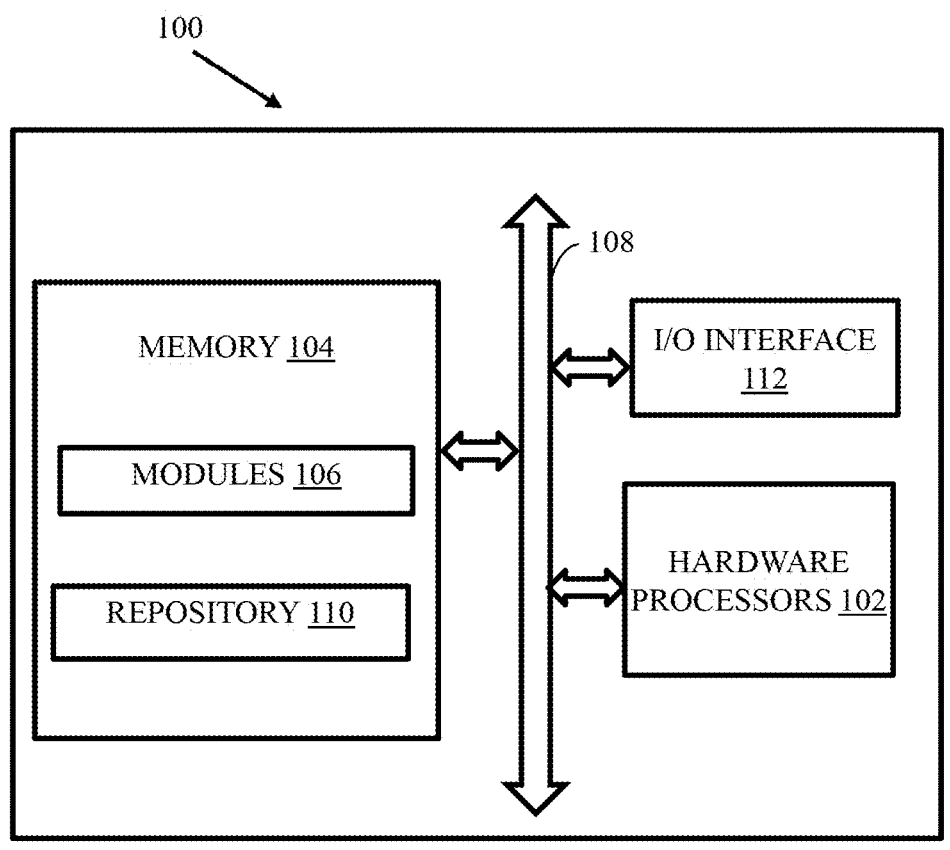
FIG. 1 illustrates an exemplary system for physics aware control of HVAC equipment, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

In order to obtain values of parameters that are directly not measurable, Physics Informed Neural networks (PINNs) are used. However, using PINNs to control building systems is non-trivial for several reasons. Basic formalism of PINNs is not readily amenable to control problems. Specifically, exogenous inputs (e.g., ambient temperature) and control decisions (e.g., mass flow rates) need to be specified as functional inputs to the neural network, which may not be known a priori. The input feature space could be very high dimensional depending upon the duration (monthly, yearly, etc.) and the (min-max) range of the inputs.

In order to address these challenges, a method and system for physics aware control of HVAC equipment is provided. The system obtains a time series data (for example, with respect to a cooling system) as input, wherein the time series data comprises information on a plurality of exogeneous variables and an associated control signal. Further, the time series data is split to data over a plurality of time slots, wherein in each of the plurality of time slots, the plurality of exogeneous variables and the associated control signal are held constants. Further, a neural network is trained. Training the neural network includes performing in each of a plurality of iterations, till training converges with a reference data, the following steps. In this process, information on time stamp, the plurality of exogenous variables, the associated control signal, and a current system state, associated with one of the plurality of time slots are fed as input to the neural network. Further, an updated system state is generated as output, by the neural network, wherein the updated system state is fed as one of the inputs to subsequent iteration in the plurality of iterations. Further, derivative of a plurality of state variables is calculated based on the generated updated system state, wherein calculated derivative of the plurality of state variables form part of a plurality of governing conditions. Further, the neural network is trained by defining a neural network loss as sum of residuals of the plurality of governing conditions and an initial condition loss, to obtain a trained data model. Further, one or more control signal recommendations are generated based on a plurality of future system states predicted by the trained data model. These signal recommendations may be then used for controlling functioning of the HVAC equipment.

5

TABLE 1

| Notations used | |
|---|---|
| Symbol | Meanings (units) |
| Thermal model and optimization | |
| $t, \delta t$ | Time instant and control time step(s) |
| $\mathcal{H}$ | Prediction horizon(s) |
| $T, W$ | Temperature ($^\circ$ C.) and humidity ratio (gkg$^{-1}$) |
| MRT | Mean Radiant Temperature ($^\circ$ C.) |
| $T_{Sp}$ | Temperature setpoint vector ($^\circ$ C.) |
| C | Thermal capacitance (J $\cdot$ K$^{-1}$) |
| $C_p$ | Specific heat capacity of air (J $\cdot$ kg$^{-1}$ $\cdot$ K$^{-1}$) |
| $\rho$ | Air density (kg $\cdot$ m$^{-3}$) |
| V | Room volume (m$^3$) |
| $E_{HVAC}$ | Energy consumed by HVAC (W $\cdot$ s) |
| $Q_i, Q_L$ | Building internal and total cooling load (W) |
| h | Specific enthalpy (J $\cdot$ kg$^{-1}$) |
| $R_i, R_o$ | Indoor and outdoor thermal resistance (W$^{-1}$ $\cdot$ K) |
| $\dot{m}$ | Mass flow rate of AHU (kg $\cdot$ s$^{-1}$) |
| $\dot{m}_g$ | Building internal moisture generation (kg $\cdot$ s$^{-1}$) |
| $K_p, K_i, K_d$ | PID gain constants |
| e | PID error ($^\circ$ C.) |
| PPD | Predicted percentage dissatisfied (%) |
| $v_a$ | Air speed (m $\cdot$ s$^{-1}$) |
| MET | Metabolic rate (met) |
| Clo | Clothing insulation (Clo) |
| Subscripts and superscripts | |
| a, w, $\infty$, sa | Air, wall, outdoor ambient, and supply air |
| x | Approximation of x |
| t | At time instant t |
| 0 | At time instant 0 |
| PINN (data model) | |
| $\mathcal{M}$ | Neural network model |
| $\tau$ | Time reset length(s) |
| $\theta$ | Parameters/weights of neural network |
| $\alpha$ | Learning rate |
| $\mathcal{L}$ | Loss function |
| $\mathcal{R}$ | Residual of equations 3-5 |
| $N_p$ | #collocation points for ODE residual loss |
| $N_0$ | #points for initial value losses |
| EPOCHS | # of training epochs |

Referring now to the drawings, and more particularly to FIG. 1 through FIG. 5J, where similar reference characters denote corresponding features consistently throughout the figures, there are shown preferred embodiments and these embodiments are described in the context of the following exemplary system and/or method.

FIG. 1 illustrates an exemplary system for physics aware control of HVAC equipment, according to some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 106.

The plurality of modules 106 include programs or coded instructions that supplement applications or functions performed by the system 100 for executing different steps involved in the process of switching between hardware accelerators for model training, being performed by the system 100. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the switching between hardware accelerators for model training.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to the steps in flow diagram in FIG. 2.

FIG. 2 is a flow diagram depicting steps involved in the process of physics aware control of HVAC equipment, by the system of FIG. 1, according to some embodiments of the present disclosure.

In an embodiment, the system 100 comprises one or more data storage devices or the memory 104 operatively coupled to the processor(s) 102 and is configured to store instructions for execution of steps of the method 200 by the processor(s) or one or more hardware processors 102. The steps of the method 200 of the present disclosure will now be explained with reference to the components or blocks of the system 100 as depicted in FIG. 1 and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 202 of the method 200, the system 100 obtains a time series data with respect to a cooling system (HVAC) as input, via the one or more hardware processors 104, wherein the time series data comprises information on a plurality of exogeneous variables and an associated control signal. The exogeneous variables include room temperature, humidity, and wall temperature, and are obtained from the HVAC system/equipment after initializing the HVAC system with initial values of each of the plurality of exogeneous variables.

Further, at step 204 of the method 200, the system 100 splits the time series data, via the one or more hardware processors 104, to data over a plurality of time slots, wherein in each of the plurality of time slots, the plurality of exogeneous variables and the associated control signal are held constants. In an embodiment, length of the time slots maybe pre-defined or dynamically configured as per requirements. Further, at step 206 of the method 200, the system 100 trains a neural network via the one or more hardware processors 104. Training the neural network includes performing in each of a plurality of iterations, till training converges with a reference data (which maybe available from one or more known sources), steps 206a through 206d.

At step 206a, the system 100 feeds data on information on time stamp, the plurality of exogeneous variables, the associated control signal, and a current system state, associated with one of the plurality of time slots, as input to the neural network. The neural network processes the data received as input, and generates an updated system state, at step 206b. Further, at step 206c, the system 100 calculates a derivative of a plurality of state variables, based on the generated updated system state, wherein calculated derivative of the plurality of state variables form part of a plurality of governing conditions. In an embodiment, the governing conditions maybe expressed as equations. Further, at step 206d, the system 100 trains the neural network by defining a neural network loss as sum of residuals of the plurality of governing conditions and an initial condition loss, to obtain a trained data model. In an embodiment, to ensure that previous conditions of the cooling systems are considered by the neural network at every time slot, state information from previous timeslot is fed as input to subsequent time slot. Training of the neural network is further explained below:

Training of the neural network involves two main steps:
   a. Defining an optimal control problem
   b. Physics Informed Neural Network (PINN) training (as the data model used of PINN type)
These steps are detailed below.
Optimal Control Problem Definition:
   The optimal control HVAC control problem is defined as $$\min_{T_{SP}} \sum_{t}^{t+\mathcal{H}} E_{HVAC} \qquad (1)$$

where, $\mathcal{H}$ is optimization horizon, $E_{HVAC}$ is HVAC energy consumption,
$T_{SP}$ is temperature set point over the optimization horizon.

$$E_{HVAC}=Q_L/\text{COP},$$

where, $Q_L$ is cooling load, and COP is coefficient of performance of HVAC chiller.
$Q_L=\text{m}\cdot(h_a-h_{sa})$ where $h_a$ and $h_{sa}$ are specific enthalpies of room air and supply air, respectively. The specific enthalpy h is a function of air temperature and humidity. During the problem formulation, compressor energy consumption is considered as an objective function, as it accounts for 80% of total HVAC energy.
Various constraints considered for optimization problem are:
   a. Thermal comfort satisfaction $$\text{all}(\text{PPD}[t{:}t+\mathcal{H}])\leq 10\%$$

where $(\text{PPD}[t{:}t+\mathcal{H}])$ are PPD values over the horizon.
   b. Environment/plant model
      Evolutions of air temperature, humidity ratio, and wall temperature are governed by the following constraints $$\frac{dT_a}{d_T} = \frac{\dot{Q}_i}{C_a} + \frac{1}{C_a\cdot R_i}(T_w - T_a) + \frac{\dot{m}CP}{C_a}(T_{sa} - T_a),$$

$$\frac{dW_a}{d_t} = \frac{\dot{m}_g}{\rho V}(W_{sa} - W_a)$$

$$\frac{dT_w}{d_t} = \frac{1}{C_w\cdot R_i}(T_a - T_w) + \frac{1}{C_w\cdot R_o}(T_a - T_w)$$

Terms related to outdoor air infiltration and solar radiation have been omitted for simplicity. The internal heat load and moisture generation depend on the room occupancy, electrical fixtures, plants in the room, and so on. During the problem formulation, the internal heat load was assumed to be constant, corresponding to a constant room occupancy. A person skilled in the art would appreciate that such assumptions/limitations can be reconfigured as per requirement, and is not of limiting nature.
   c. AHU mass flow rate evolution model: The evolution of AHU mass flow rate (ṁ) is governed by the HVAC PID control logic and is of the form $$\dot{m}^t = \dot{m}^{t-\delta t} + \kappa_P\cdot e^t + \kappa_i\cdot\sum e^t\delta_t + \kappa_d\cdot\frac{e^t - e^{t-\delta t}}{\delta_t},$$

where, the error $e^t = T_a{}^t - T_{SP}{}^t$

PINN Training (Algorithm 1):

---

Hyperparameters:
  1 $\alpha$                                          // Learning rate of neural network
  2 EPOCHS                                            // number of iterations
Inputs:
  3 $N_P$              // Number of collocation points for physics loss term
  4 $N_0$              // Number of points for initial-value loss term
  5 $\tau$                                            // Time reset length
  6 $\chi_p \leftarrow$ Sample [(t, $T_\infty$, ṁ, $T_a{}^0$, $T_w{}^0$, $W_a{}^0$), $N_p$]              // Draw samples for
physics loss
  7 $\chi_0 \leftarrow$ Sample [(0, $T_\infty$, ṁ, $T_a{}^0$, $T_w{}^0$, $W_a{}^0$), $N_0$]                 // Draw samples for
initial value loss
  8 $\mathcal{Y}_0 \leftarrow \chi_0$ [: ; $(T_a{}^0, T_w{}^0, W_a{}^0)$]
  9 Randomly initialize model $\mathcal{M}$ parameters $\theta$
10 for e = 1 to EPOCHS do
11 $(\hat{T}_a(\theta), \hat{T}_w(\theta), W_a(\theta)) \leftarrow$ Evaluate $\mathcal{M}(\chi_p)$
12 $\mathcal{Y}_0 \leftarrow$ Evaluate $\mathcal{M}(\chi_0)$ 13 $\left( \dfrac{d\hat{T}_a(\theta)}{dt}, \dfrac{d\hat{T}_w(\theta)}{dt}, \dfrac{d\hat{W}_a(\theta)}{dt} \right) \leftarrow AutoDiff(\hat{T}_a, \hat{T}_w, \hat{W}_a)$ // Automatic differentiation
14 $\mathcal{R}_{T_a}, \mathcal{R}_{W_a}, \mathcal{R}_{T_w} \leftarrow$ Obtain residuals using lines 11 and 13 for equations
(3), (4), (5) as functions of $\theta$ 15 $\mathcal{L}_{phy} \leftarrow \dfrac{1}{N_p} \left\| \mathcal{R}_{T_a} \right\|^2 + \dfrac{1}{N_p} \left\| \mathcal{R}_{T_w} \right\|^2 + \dfrac{1}{N_p} \left\| \mathcal{R}_{W_a} \right\|^2$ 16 $\mathcal{L}_{init} \leftarrow \dfrac{1}{N_0} \left\| \hat{\mathcal{Y}}_0 - \mathcal{Y}_0 \right\|^2$ 17 $\mathcal{L}(\theta) \leftarrow \mathcal{L}_{phy} + \mathcal{L}_{init}$
18 Evaluate gradients, $\nabla_\theta \mathcal{L}(\theta)$
19 Update parameters, $\theta \leftarrow \theta - \propto \bullet \nabla_\theta \mathcal{L}(\theta)$
20 end for
21 Return $\mathcal{M}(\theta)$

---

Figure 3:
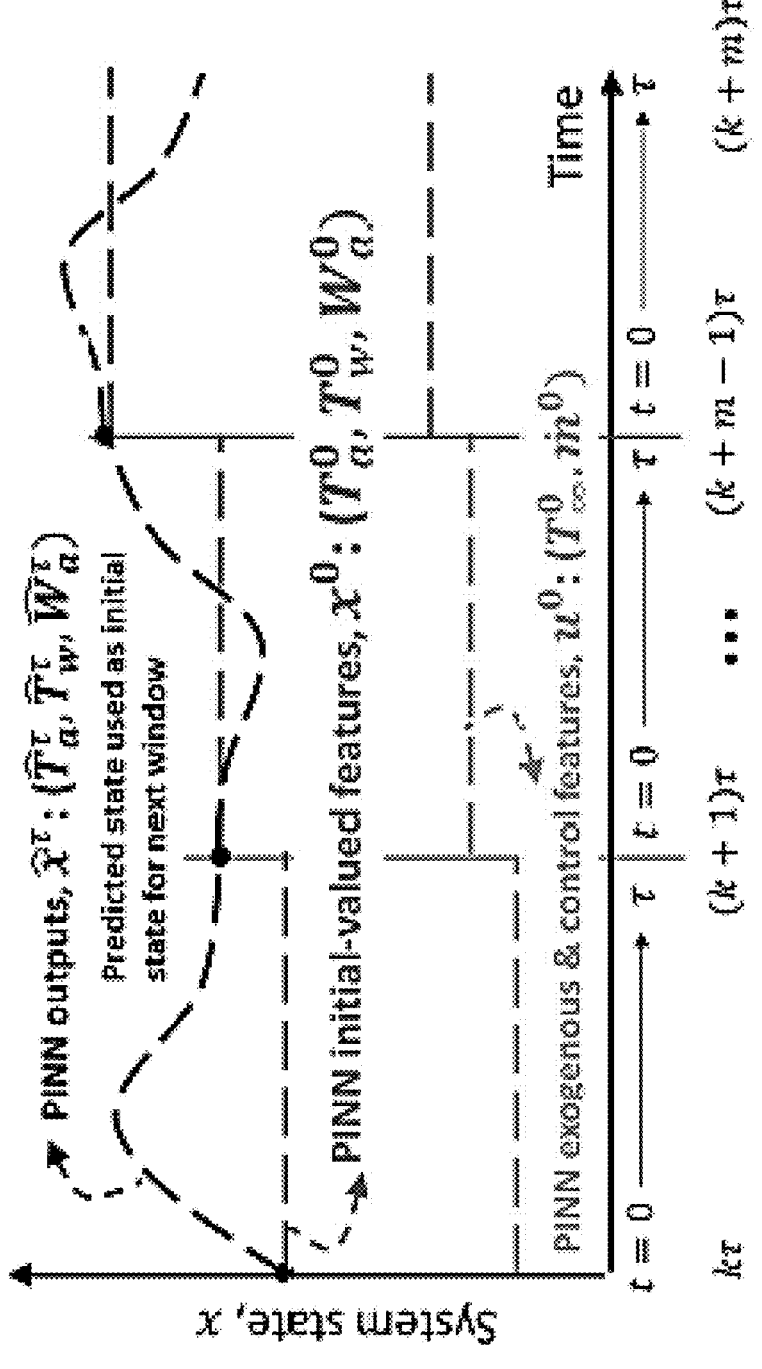
FIG. 3 is a graphical representation of model training being carried out by the system of FIG. 1, according to some embodiments of the present disclosure.

Schematic of the PINN training approach used by the system 100 is given in FIG. 3, and an algorithmic representation of the training approach is given in Algorithm 1. The time horizon is divided into multiple time slots of equal length $\tau$ (time reset). Within each $\tau$, it is assumed that the external inputs and the initial values are invariant (zero-order hold assumption). This eliminates the need to know a priori the exact functional variation of the external inputs with time. The PINN, trained only over the period $\tau$, can now be used with constant initial values and constant external inputs as additional input features. This is because the assumption of constant external inputs within $\tau$ results in the partial derivative of the thermal parameters estimated by automatic differentiation to be a correct estimate of the total derivative. Another advantage of the simplification is the reduction in sample space that is computationally tractable. This PINN modification is a candidate for MPC with a receding horizon technique where the control input is constant over the control time step. An advantage of this PINN formulation over the numerical integrators available to solve the ODE (such as RK4) is that output for any time $t' \in [k\tau, (k+1)\tau]$ can be directly predicted with a forward pass without the need to predict at intermediate points within $[k\tau, t']$. As $\tau$ is reduced, the prediction given by the PINN approaches the true solution for the thermal parameters given by solving the ODEs for the actual functional inputs.

As the PINN is used with MPC in a receding horizon technique, the predicted outputs at t's such as $\hat{x}^{t+1}, \ldots \hat{x}^{t+m}$, which become inputs at their respective following control step, are replaced with the actual observed values from the environment. This reduces error accumulation across control time steps. Only those parameters that are sensed in the BMS (such as Ta, Wa, T∞, and ṁ) are directly fed back to the prediction model. Tw is usually not measured and thus needs to be approximated. For this purpose, $\hat{T}_w$ predicted by the model at the current time step t is used as a soft-sensed input $T_w{}^{t+1}$ to the next control step, as shown in FIG. 3.

Further, based on the time resetting and zero-order hold assumption, the following six input features are chosen for PINN formulation:

a) Time instant $t \in [0, \tau]$
b) $T_\infty{}^t$ assumed constant over $[k\tau, (k+1)\tau] \forall k$
c) $\dot{m}^t$ assumed constant over $[k\tau, (k+1)\tau] \forall k$
d) Initial value of $T_a{}^0$ at beginning of each time slot
e) Initial value of $T_w{}^0$ at beginning of each time slot
f) Initial value of $W_a{}^0$ at beginning of each time slot Three output variables of the PINN are $\hat{T}_a{}^t$, $\hat{T}_w{}^t$, and $W_a{}^t$ for any time t given as input.

A self-supervised approach is used for training of the PINN. In this process, initially a set of hyper-parameters are initialized. Learning rate $\alpha$, EPOCHS, $N_P$, $N_0$, and $\tau$. Further, $N_p$ collocation examples of (t, $T_\infty$, ṁ, $T_a{}^0$, $T_w{}^0$, $W_a{}^0$) and $N_0$ initial values examples of (0, $T_\infty$, ṁ, $T_a{}^0$, $T_w{}^0$, $W_a{}^0$) are collected for evaluating physics and initial-value losses, respectively. An appropriate sampling technique, for example, Latin Hypercube Sampling (LHS), maybe used for sampling input features from respective ranges. Subsequently the network parameters are initialized. Further, a forward pass of the neural network is done to get an estimate of the thermal model parameters at $\chi_P$ and $\chi_0$.

Derivatives of the estimates of temperatures and humidity ratio are evaluated with respect to t using automatic differentiation (as functions of θ). Further, the model estimates and their gradients along with the external and control inputs are plugged into in Equations 3-5 to calculate the ODE residuals (difference between the left hand and right hand sides of the ODE); this is shown in Line 14 of algorithm 1. The physics loss $L_{phy}$ is calculated as the sum of the individual mean squared ODE residuals (Line 15). The initial value loss $L_{init}$ is calculated as the mean squared error between $\hat{\mathcal{G}}$ (estimated in Line 12) and $\hat{\mathcal{G}}_0$ (sampled in Line 8). The total loss function L(θ) is the sum of the physics loss and the initial-value loss. The gradients of the loss function with respect to the network parameters are evaluated in Line 18. Further, the network parameters are updated using the standard gradient descent algorithm in Line 19. Though not shown, loss contributions from each thermal parameter could be weighted differently in order to improve the performance of the trained PINN.

The trained data model maybe then deployed to process real-time data from the cooling system. When deployed, the system 100 collects and processes the real-time data with respect to value of the exogeneous variables and the associated control signal, using the trained data model, to predict future system states, which in turn is used to generate one or more control signal recommendations. The control signal recommendations maybe then used to control operation of the cooling system/HVAC.

Figure 4:
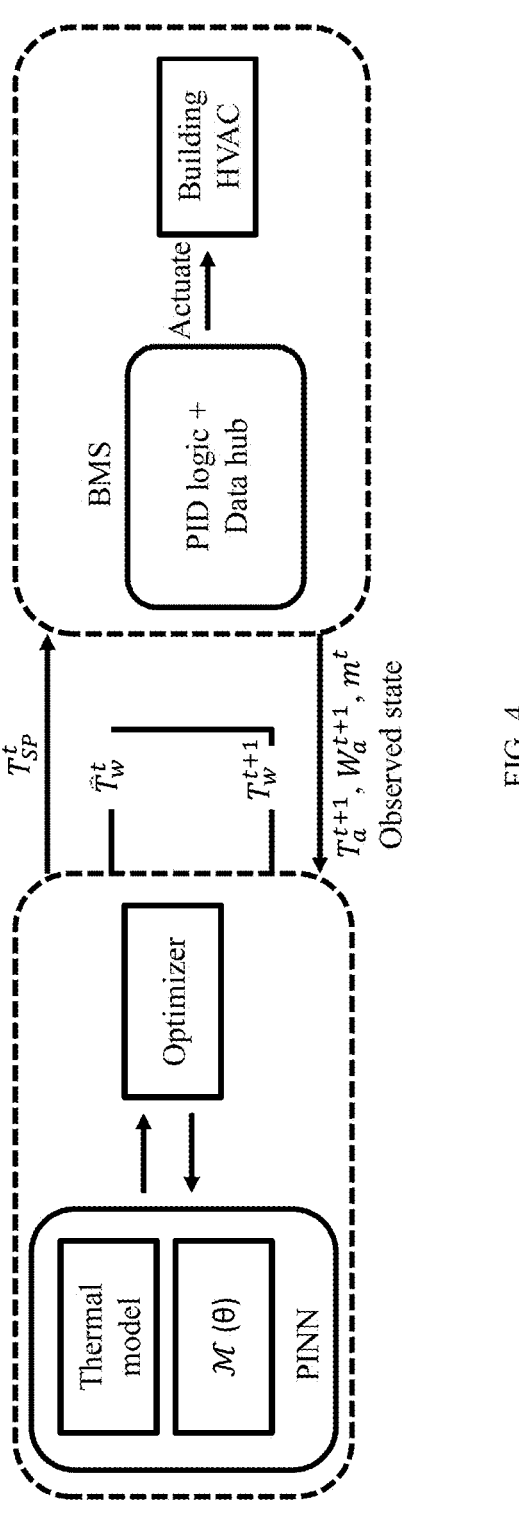
FIG. 4 is an example implementation of the system of FIG. 1 for controlling HVAC operation of a building, according to some embodiments of the present disclosure.

Example implementation of the system 100 of FIG. 1 is depicted in FIG. 4. As depicted, the data model i.e. PINN, in the system 100, is configured to be in communication with the HVAC in a building (alternately referred to as 'Building management System (BMS)') where the system 100 is deployed, collects information with respect to the exogeneous variables and the associated control signal, as input. The system 100 then processes the input using the data model and generates one or more recommendations. The recommendations are then used to control functioning of the HVAC, by actuating one or more settings of the HVAC based on the recommended control signals.

Experimental Data a. Experimental Setup

Experiments were designed to evaluate: (1) the accuracy of PINN thermal model in isolation; and (2) the efficiency of PINN when used in Physics-Aware Control Manager (PAC-MAN) control. For the former, LSTM was used as baseline. For the latter, different controls were used as baselines.

1. Thermal Model Evaluation

Ground truth: Experimental environment was simulated using a numerical integration of the thermal model (Equations 3-5). Specifically, a fourth-order Runge-Kutta method (RK4) was used, which is an accurate and widely used method for solving initial-value problems governed by first-order ODEs. The simulation time step was 15 minutes. The constants used in the thermal model (Equations 3-5) are summarized in Table 2. Note that $\dot{m}_g$ in Equation 4 varies dynamically since it is a function of the latent load (a constant) and latent heat of vaporization (a function of $T_a$). A PID control logic also was simulated (Equation 6), the gain constants of which are tuned using the Ziegler-Nichols methods. Furthermore, the PID control logic (Equation 6) usually operates within a temperature dead-band, that is, is not adjusted if $T_a \in [TSP \pm dead\text{-}band]$. An anti-windup logic also was implemented where the integral error is not propagated if $T_a \in [TSP \pm dead\text{-}band]$.

TABLE 2

| Parameter | Value | Parameter | Value |
|---|---|---|---|
| $Q_i$ | 5000 | $C_a$, $C_w$ | 50e6, 306e6 |
| $R_i$, $R_o$ | 3.2e-5, 1.1e-5 | ρ, $C_P$ | 1.2, 1005 |
| $T_{sa}$, $W_{sa}$(g · kg$^{-1}$) | 13, 8 | Latent load | 1250 |
| m | ∈ [0., 3.] | $T_{SP}$ | ∈ [15., 30.] |
| $K_p$, $K_i$, $K_a$ | 0.1, 0.0001, 0. | PID dead-band | ±1 |

PINN specific details: Theoretically, τ≥control time step. The time reset parameter τ is taken 15 minutes. Depending on the choice of τ, there will be a trade-off between computation speed and accuracy. The input features, which are the time instant t, temperatures $T_\infty$, $T_a^0$, $T_w^0$, humidity ratio $W_a^0$, and mass flow rate ṁ are sampled from [0, τ], [14.5, 39.5]° C., [5, 16] g·kg$^{-1}$, and [0, 3] kg·s$^{-1}$, respectively. The neural network loss $\mathcal{L}(\theta)$ is the sum of physics loss $\mathcal{L}(\theta)$ (ODE residuals) and initial value loss $\mathcal{L}(\theta)$. A Tanh activation function was used for all hidden layers as it works better than other activation functions such as sigmoid and ReLU for problems involving approximating non-linear governing ODEs/PDEs. The number of iteration EPOCHS=2M.

LSTM specific details: The labeled temporal examples of $T_\infty$, $T_a$, $W_a$, and ṁ required for LSTM model were sampled from the environment observations. Note that, although $T_w$ is usually not measured, to make a fair comparison with PINN, $T_w$ temporal examples were used as an input to LSTM. The sampling frequency used was 15 minutes. LSTM was implemented using the standard Tensorflow-Keras function.

Table 3 summarizes a few of the hyperparameters used in the training of both the PINN and LSTM models. A typical annual ambient profile of a building in a tropical climatic region was considered, where $T_\infty \in [14.5, 39.5]$° C.

TABLE 3

| Hyper-parameter | Value | Hyper-parameter | Value |
|---|---|---|---|
| Size of input layer | 6 | #hidden-layers | 2 |
| #nodes per hidden layer | 20 | Size of output layer | 3 |
| Hidden layer activation | Tanh | Optimizer | Adam |
| Output layer activation | Linear | α | 1e-4 |
| Input normalization | Min-Max, −1, +1] | | |

Performance metric for thermal model evaluation: Efficacy of thermal models were evaluated using the average relative error between the predicted and the ground truth values for $T_a$, $W_a$, $T_w$.

Control Evaluation

Decision variable for optimal control is the indoor air temperature setpoint vector $T_{sp}$, which is used as a reference value in the PID control logic. During the experiments, the following methods were considered to evaluate the control efficacy of PACMAN.

(1) BL1 (As-is): A constant setpoint of TSP=23±1° C. was assumed throughout the HVAC operation. This is the most commonly observed control strategy implemented in buildings.

(2) BL2 (Seasonal TSP): A constant setpoint of TSP=22±1° C. was considered during the summer months and TSP=23±1° C. during the rest of the year. This seasonal choice of setpoints is expected to increase occupants' comfort during the warmer months. The following two baselines and PACMAN undertake model based optimal setpoint determination in a receding horizon control framework. The control time step and the prediction horizon H have the same length of 15 minutes. These control techniques differ only in the model used for predicting the thermal parameters over the prediction horizon.

(3) BL3 ('oracle' MPC): Complete knowledge of the system and external disturbances of the thermal parameters as seen by the environment. Though unrealistic, this baseline quantifies the best that can be achieved. The thermal model used is the ground truth RK4.

(4) BL4 (MPC+LSTM): The LSTM-model was used to predict the thermal parameters over the optimisation horizon. The PINN thermal model was replaced by the LSTM model during the experiments.

(5) PACMAN: The PINN was used as thermal model in optimal control framework (FIG. 1). The time reset length $\tau$ is the same length as the control step, that is, $\tau$=15 minutes.

Performance metrics for control evaluation: Two metrics: (1) The annual HVAC energy consumed in MWh, (2) The percentage of HVAC operation time that the comfort is unmet, that is, PPD>10%, were considered. Lower energy and unmet comfort hours indicate a better control strategy. In the PPD calculation, $v_a$, MET, and Clo were fixed at 0.1 m/s, 1.2 met, and 0.5 Clo, respectively.

Experimental Results a. Thermal Model Evaluation

Figure 5A:
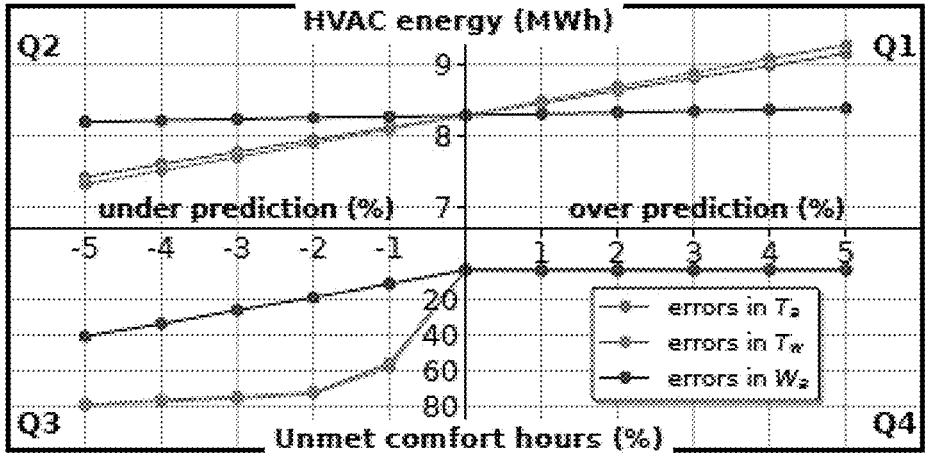
FIGS. 5A through 5J depict graphical representation of experimental data, in an experimental implementation of the system of FIG. 1, according to some embodiments of the present disclosure.

Need for accuracy in thermal model. FIG. 5A shows the sensitivity of the optimal control solution to model errors. The X-axis represents the percentage of errors injected into the thermal model. The top Y-axis (Q1-Q2) is the annual HVAC energy consumed in MWh, and the bottom Y-axis (Q3-Q4) is the percentage unmet comfort hours. The following model errors were considered: ±1, ±2, ±3, ±4, and ±5%. Positive errors were used to evaluate the model's over-predictions and vice versa. Errors were introduced in one parameter at a time. Specifically, when an error is introduced in $T_a$, the model errors in $T_w$ and $W_a$ are kept at zero. The following were inferred from FIG. 5A: (1) The optimal control solution (energy and unmet comfort hours) is more sensitive to errors in $T_a$ and $T_w$ compared with $W_a$. (2) Thermal parameters $T_a$ and $T_w$ are equally important. (3) The HVAC energy varies almost linearly with errors in $T_a$ and $T_w$ because the HVAC energy is modelled as a function of enthalpy, which is a linear function of $T_a$. Note that errors in $T_w$ affect the enthalpy through $T_a$ ($T_a$ and $T_w$ are connected via the governing equations). (4) A trend was observed in the unmet comfort hours. When the model over-predicts thermal parameters, the unmet hours remain nearly unchanged. However, when the model under-predicts the parameters, particularly $T_a$ and $T_w$, the unmet hours increase non-linearly. This behaviour is explained as follows. For cooling, a higher temperature setpoint leads to a lower HVAC energy and vice versa. The thermal comfort is bounded by PMV±0.5, which is equivalent to PPD≤10%. During over-prediction (under-prediction), the model picks TSP closer to lower (higher) value of $T_{SP}^{opt}$. Because the optimiser is trying to minimise energy, it picks a higher TSP among the acceptable values, and the chosen TSP during over-prediction has more cushion to the thermal comfort boundaries compared with TSP picked during under-prediction.

For model errors in the range of (−5% to +5%) in $T_a$ and $T_w$, the percentage change in the energy from the 'oracle' model (zero errors) is −11% to +13% and the unmet comfort hours vary from 80% to 3%. For model errors in $W_a$ (−5% to +5%), the energy changes are marginal from −1.1% to +1.2% while the unmet hours vary from 40% to 3%. These experiments demonstrate the need for an accurate thermal model.

b. Prediction Accuracy of PINN vs. Ground Truth.

Figure 5B:
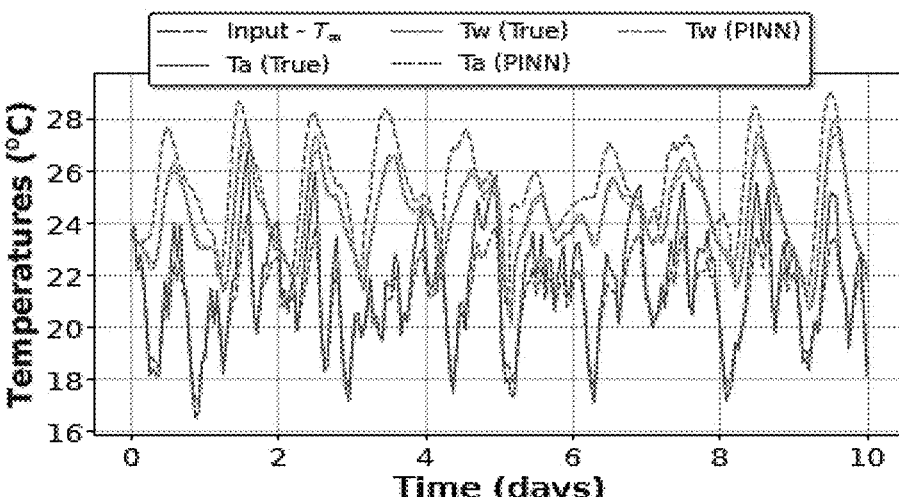
Figure 5C:
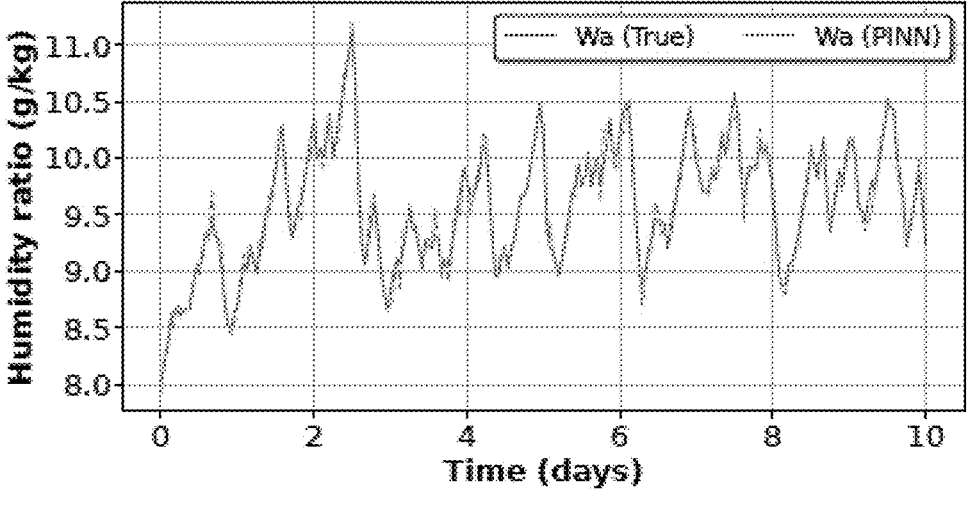
Figure 5D:
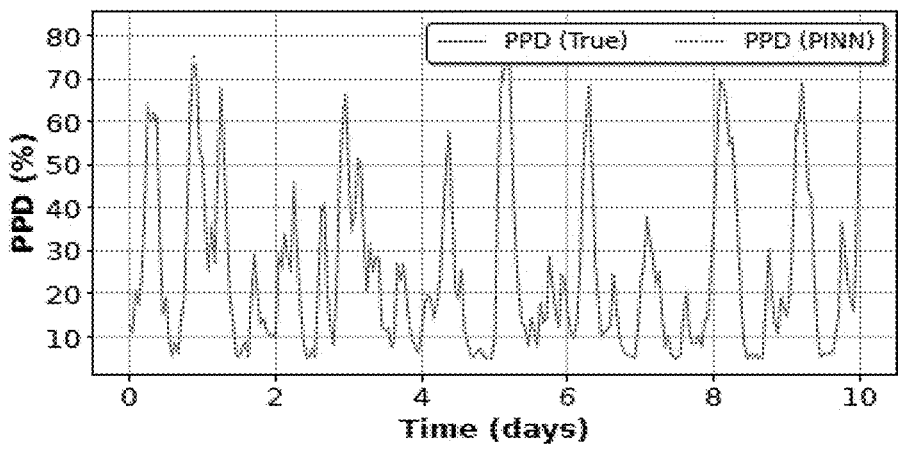
Figure 5E:
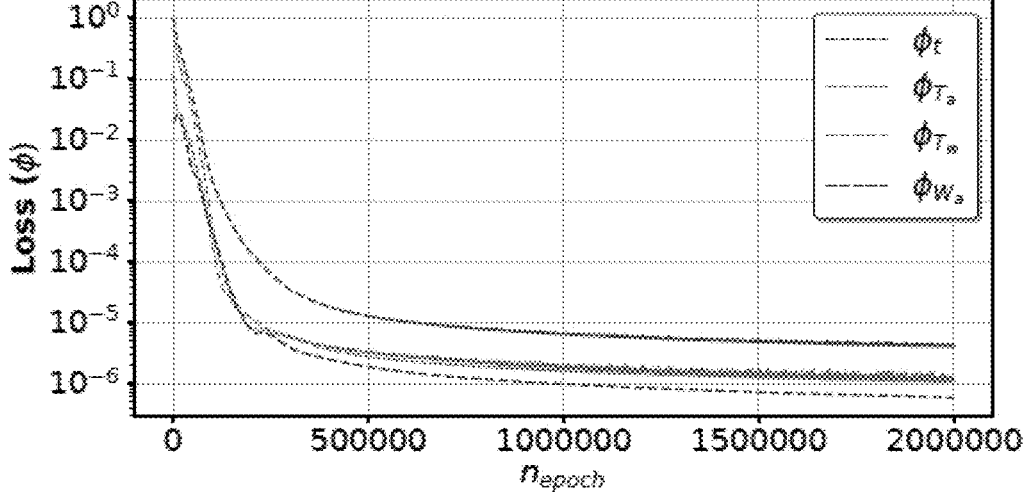

FIG. 5B shows the thermal parameter profiles obtained by PINN and compares the solution with the ground truth. The X-axis represents the time in days, and the Y-axis represents the three primary thermal parameters, namely $T_a$ and $T_w$ (FIG. 5C), $W_a$ (FIG. 5D), and a derived metric PPD (FIG. 5E). It was observed that PINN compares well with the ground truth data (the solid and dashed lines almost overlap) and gives 0.4%, 0.2%, and 0.7% average errors in $T_a$ and $T_w$, $W_a$ over the annual profiles (zoomed to 10 days time window in FIGS. 5C, 5D, and 5E to highlight the goodness of the predictions). Because PPD is a non-linear function of $T_a$ and $T_w$, $W_a$, a slightly higher error of 2.2% was noted in PPD.

FIG. 5E shows the reduction in ODE residuals for each of the three differential equations ($\phi_{T_a}$, $\phi_{T_w}$, and $\phi_{W_a}$) along with the total loss $\phi_t$. A smooth decrease in the loss was observed for all physical parameters of interest with training.

c. PINN vs Purely Data-Driven Models.

Figure 5F:
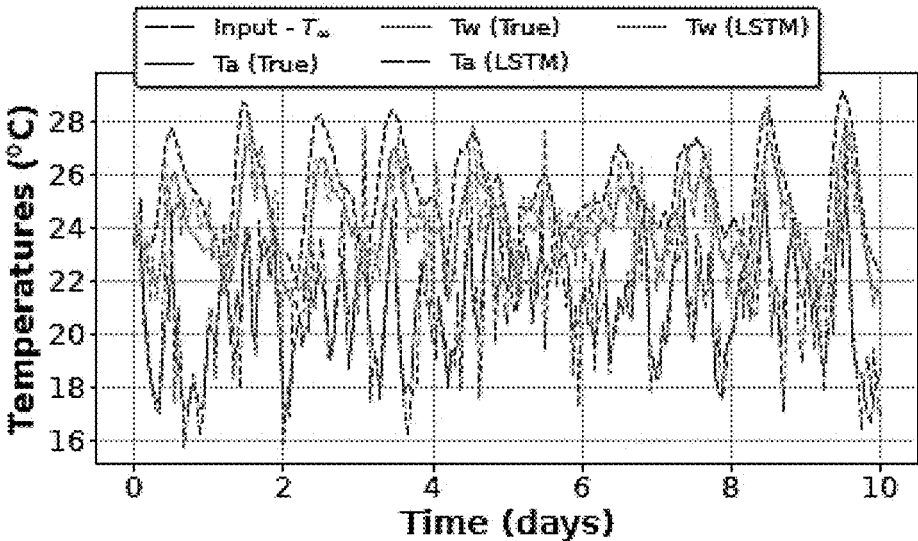
Figure 5G:
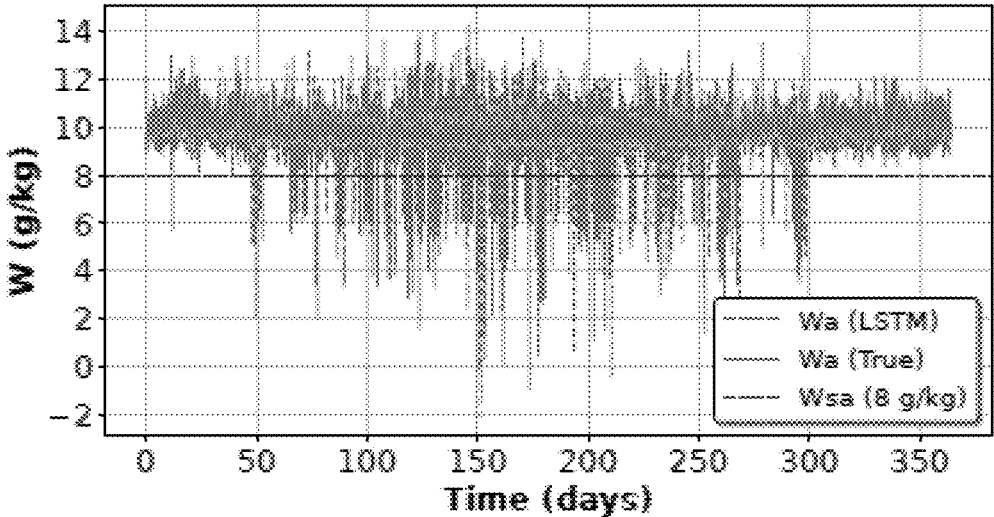

The temperature and humidity ratio predictions with LSTM are shown in FIG. 5F. The temperature predictions are zoomed to 10 days, while the humidity ratio predictions are shown for the entire year to demonstrate unphysical solution. The LSTM model gave 5%, 3%, and 7% errors in $T_a$ and $T_w$, $W_a$ respectively, while an error of at most 1% for $T_a$ and $T_w$ was needed to avoid severe discomfort. Furthermore, LSTM is a purely data-driven model and so may result in unphysical results, as shown in FIG. 5G. The humidity ratio was observed to go below the supply value $W_{sa}$=8 g/kg and is also seen to take negative values, which is unphysical. Because the humidity was added to the room by the occupants in our experiments, the resulting $W_a$ couldn't go below $W_{sa}$ for the operating conditions we consider. The poor performance of LSTM was also noted for a building heating and cooling problem. PINN has the required accuracy and does not violate any physical constraints on the parameters due to its underlying physics modelling.

Figure 5H:
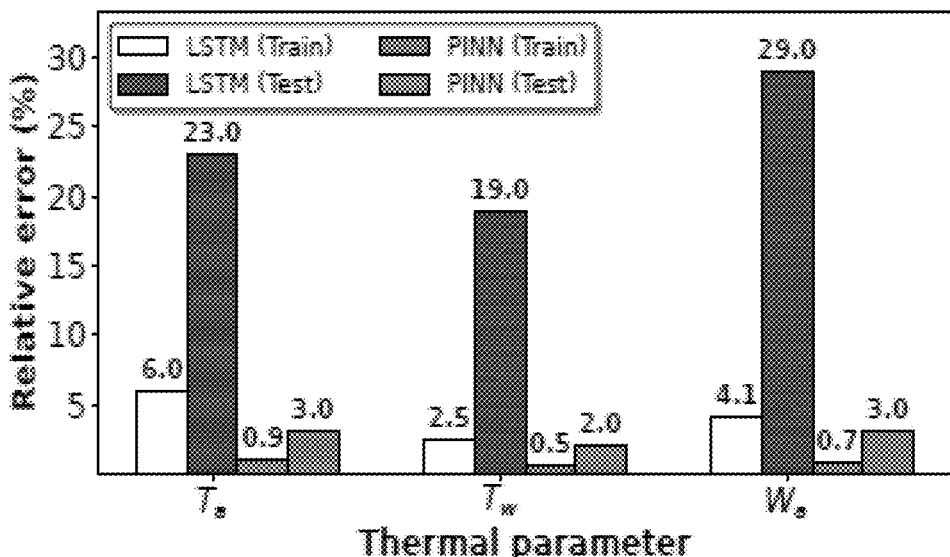

Generalizability: Any data-driven model would need to train over a wide range and a large number of sample values of the physical parameters to generalize well at unseen input values. However, since PINN is physics-constrained, it can learn the underlying physical process even with limited data and generalize better than a purely data-driven approach. We demonstrate generalizability by training both LSTM and PINN with summer months data, where the ambient temperature values are sampled from 28-40° C. Next, the trained models were used to predict the solution at out-of-distribution ambient temperatures from 15-25° C. FIG. 5H compares training and generalization (test) errors for LSTM and PINN. We observe that LSTM generalizes poorly over the out-of-distribution test dataset for all the thermal parameters, whereas PINN generalizes well over the out-of-distribution test dataset by learning the underlying physics. Although better than LSTM, PINN generalization errors on out of distribution samples are still higher than the desired errors (<1%). The finding was consistent with a reference result used, where PINN was shown to have higher generalization error when the samples deviated significantly from the samples used in training.

Figure 5I:
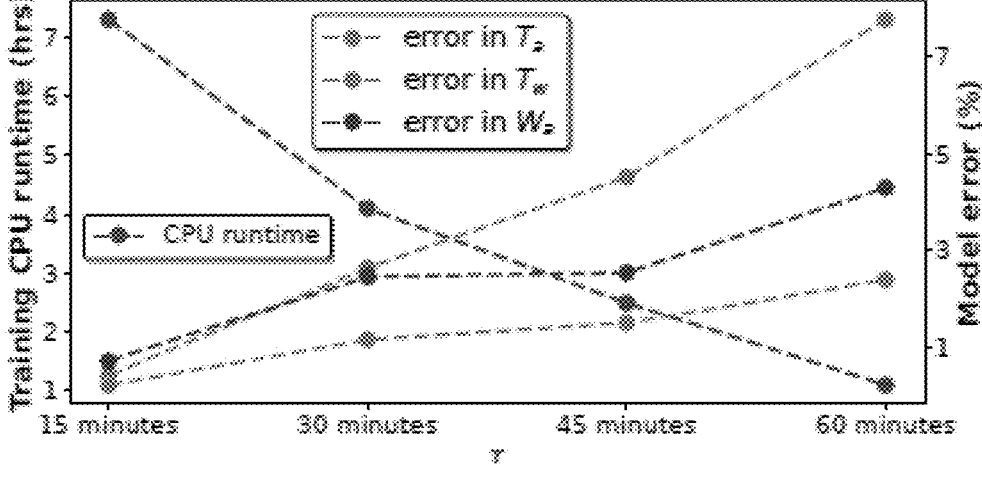

Sensitivity of PINN to τ. FIG. 10 studies the sensitivity of PINN to the time reset length τ. The X-axis represents τ. The primary Y-axis represents the PINN's CPU runtime during training and the secondary Y-axis is the thermal model error. Values τ=15, 30, 45, and 60 minutes were considered. The runtime dropped sharply from 7.3 hours at τ=15 minutes to 1.2 hours at τ=60 minutes. Because the inputs to the model were held constant over the time reset window, it was expected that the smaller the τ is, the lower is the model error. In FIG. 5I, it was observed that the errors for all the thermal parameters progressively increase with increasing τ, were as expected.

Control Evaluation of PACMAN

Figure 5J:
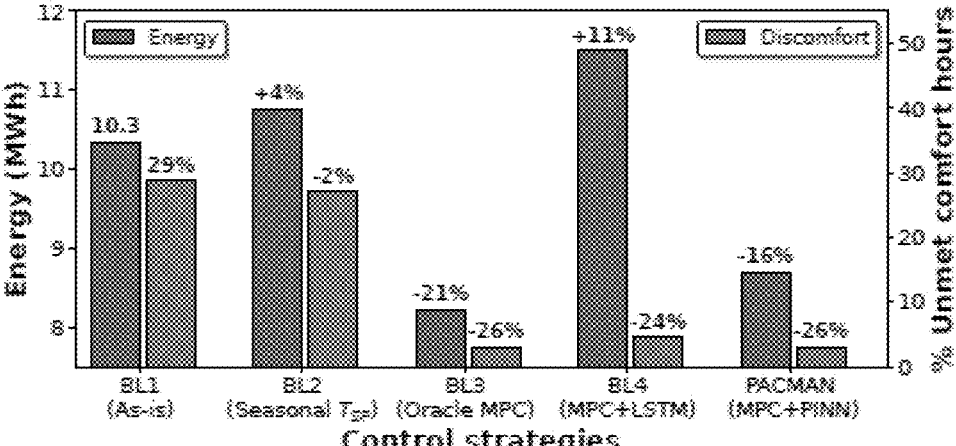

FIG. 5J compares PACMAN's control performance with that of the baselines. The numerals on top of the bar chart for BL1 indicate the raw energy consumption in MWh and the percentage of unmet comfort hours. For BL2 through PAC-MAN, the numerals indicated are percentage relative changes for energy and percentage point changes for the percentage unmet comfort hours compared to BL1. The as-is control (BL1) used a fixed setpoint of TSP=23±1° C. throughout the HVAC operation and consumed approximately 10.3 MWh of annual energy with 29% annual unmet comfort hours (that is, for 29% of the year the PPD>10%). BL2 used a seasonal setpoint strategy, that is, TSP=22±1° C. during summer months and TSP=23±1° C. during the rest of the year. BL2 reduced the percentage unmet comfort hours by a marginal 2% points while consuming 4% more energy over 10 BL1 due to using a lower setpoint during the summer months. The 'oracle' MPC (BL3) limited the maximum possible energy reduction while reducing unmet comfort hours. BL3 results in 21% energy savings and reduces percentage unmet comfort hours by 26% points over BL1. In BL4, the thermal model of MPC is represented by LSTM. The LSTM may result in unphysical results particularly for $W_a$ prediction. For the sake of control with LSTM, $W_a$ was lower bound to an acceptable range. While BL4 reduced the percentage unmet comfort hours by 24% points compared to BL1, it consumed 11% more energy. PACMAN outperformed all other baselines except BL3 (the 'oracle' controller) in reducing energy and unmet comfort hours. PACMAN reduced energy by 16% and percentage unmet comfort hours by 26% points over BL1. PACMAN's unmet comfort hours were found to be comparable to BL3, albeit by consuming 6% more energy than BL3. This shows that PINNs can help to improve control optimization by improved modelling.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of HVAC control. The embodiment, thus provides a mechanism for building a PINN based data model for HVAC. Moreover, the embodiments herein further provides a mechanism of controlling operation of HVAC based on control signals recommended using predicted future states of the HVAC, using the PINN based data model.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of generating a neural network model, comprising:

obtaining, via one or more hardware processors, a time series data with respect to a cooling system as input, wherein the time series data comprises information on a plurality of exogeneous variables and an associated control signal;

splitting, via the one or more hardware processors, the time series data to data over a plurality of time slots, wherein in each of the plurality of time slots, the plurality of exogeneous variables and the associated control signal are held constants; and training, via the one or more hardware processors, a neural network, comprising, performing in each of a plurality of iterations, till training converges with a reference data:

feeding information on time stamp, the plurality of exogenous variables, the associated control signal, and a current system state, associated with one of the plurality of time slots, as input to the neural network;

generating an updated system state as output, by the neural network, wherein the updated system state is fed as one of the inputs to subsequent iteration in the plurality of iterations;

calculating derivative of a plurality of state variables, based on the generated updated system state, wherein calculated derivative of the plurality of state variables form part of a plurality of governing conditions; and training the neural network by defining a neural network loss as sum of residuals of the plurality of governing conditions and an initial condition loss, to obtain a trained data model.

2. The processor implemented method of claim 1, wherein one or more control signal recommendations are generated based on a plurality of future system states predicted by the trained data model.

3. The processor implemented method of claim 1, wherein the time series data is obtained from a Heating Ventilation and Air-Conditioning (HVAC) system after initializing the HVAC system with initial values of each of the plurality of exogeneous variables.

4. The processor implemented method of claim 1, wherein the plurality of exogeneous variables comprise room temperature, humidity, and wall temperature.

5. A system for generating a neural network model, comprising:

one or more hardware processors;

a communication interface; and a memory storing a plurality of instructions, wherein the plurality of instructions when executed, cause the one or more hardware processors to:

obtain a time series data with respect to a cooling system as input, wherein the time series data comprises information on a plurality of exogeneous variables and an associated control signal;

split the time series data to data over a plurality of time slots, wherein in each of the plurality of time slots, the plurality of exogeneous variables and the associated control signal are held constants; and train a neural network, by performing in each of a plurality of iterations, till training converges with a reference data:

feeding information on time stamp, the plurality of exogenous variables, the associated control signal, and a current system state, associated with one of the plurality of time slots, as input to the neural network;

generating an updated system state as output, by the neural network, wherein the updated system state is fed as one of the inputs to subsequent iteration in the plurality of iterations;

calculating derivative of a plurality of state variables, based on the generated updated system state, wherein calculated derivative of the plurality of state variables form part of a plurality of governing conditions; and training the neural network by defining a neural network loss as sum of residuals of the plurality of governing conditions and an initial condition loss, to obtain a trained data model.

6. The system of claim 5, wherein the one or more hardware processors are configured to generate the one or more control signal recommendations based on a plurality of future system states predicted by the trained data model.

7. The system of claim 5, wherein the one or more hardware processors are configured to obtain the time series data from a Heating Ventilation and Air-Conditioning (HVAC) system after initializing the HVAC system with initial values of each of the plurality of exogeneous variables.

8. The system of claim 5, wherein the plurality of exogeneous variables comprise room temperature, humidity, and wall temperature.

9. One or more non-transitory machine-readable information storage mediums comprising one or more instructions which when executed by one or more hardware processors cause:

obtaining a time series data with respect to a cooling system as input, wherein the time series data comprises information on a plurality of exogeneous variables and an associated control signal;

splitting the time series data to data over a plurality of time slots, wherein in each of the plurality of time slots, the plurality of exogeneous variables and the associated control signal are held constants; and training a neural network, comprising, performing in each of a plurality of iterations, till training converges with a reference data:

feeding information on time stamp, the plurality of exogenous variables, the associated control signal, and a current system state, associated with one of the plurality of time slots, as input to the neural network;

generating an updated system state as output, by the neural network, wherein the updated system state is fed as one of the inputs to subsequent iteration in the plurality of iterations;

calculating derivative of a plurality of state variables, based on the generated updated system state, wherein calculated derivative of the plurality of state variables form part of a plurality of governing conditions; and training the neural network by defining a neural network loss as sum of residuals of the plurality of governing conditions and an initial condition loss, to obtain a trained data model.

10. The one or more non-transitory machine-readable information storage mediums of claim 9, wherein one or more control signal recommendations are generated based on a plurality of future system states predicted by the trained data model.

11. The one or more non-transitory machine-readable information storage mediums of claim 9, wherein the time series data is obtained from a Heating Ventilation and Air-Conditioning (HVAC) system after initializing the HVAC system with initial values of each of the plurality of exogeneous variables.

12. The one or more non-transitory machine-readable information storage mediums of claim 9, wherein the plurality of exogeneous variables comprise room temperature, humidity, and wall temperature.

* * * * *